United States Patent
Beckhausen et al.

(10) Patent No.: US 6,534,731 B1
(45) Date of Patent: Mar. 18, 2003

(54) SAFETY EDGE SWITCH

(76) Inventors: Karlheinz Beckhausen, Landgrafenstrasse 109, D-50931 Cologne (DE); Jurgen Menz, Heldehofweg 25, 50858 Cologne (DE)

( * ) Notice: Subject to any disclaimer, the term of this patent is extended or adjusted under 35 U.S.C. 154(b) by 88 days.

(21) Appl. No.: 09/662,050

(22) Filed: Sep. 15, 2000

(51) Int. Cl.⁷ .................................................. H01H 3/16
(52) U.S. Cl. ..................... 200/61.43; 187/317; 200/511
(58) Field of Search ............................. 200/511, 61.43, 200/61.44; 187/317

(56) References Cited

U.S. PATENT DOCUMENTS

| | | | | |
|---|---|---|---|---|
| 5,023,418 A | * | 6/1991 | Beckhausen | ................ 200/511 |
| 5,072,080 A | * | 12/1991 | Beckhausen | ............. 200/61.43 |
| 5,780,793 A | * | 7/1998 | Buchholz et al. | ......... 200/61.44 |
| 6,107,580 A | * | 8/2000 | Hoshikawa et al. | ..... 200/61.43 |

FOREIGN PATENT DOCUMENTS

| | | |
|---|---|---|
| DE | 3304 400 | 8/1984 |
| EP | 0352 332 | 2/1990 |

* cited by examiner

*Primary Examiner*—Renee Luebke
(74) *Attorney, Agent, or Firm*—Charles L. Schwab; Nexsen Pruet Jacobs & Pollard, LLC

(57) ABSTRACT

Safety edge switch (1) for power-driven equipment or power-driven doors, sliding equipment and so forth of vehicles, with a hollow profile made of an elastomeric material and having a mounting profile (2) and a shell part (3), in which hollow profile there is an internal body (4), the internal body part (4) and the shell part (3) having electrically conductive zones that, upon mutual contact, initiate a switching pulse that can be led to an interpretation unit. The mounting profile (2) is made electrically conductive and is electrically conductively connected to the internal body part (4) or the shell part (3).

4 Claims, 1 Drawing Sheet

SAFETY EDGE SWITCH

TECHNICAL FIELD

This invention relates to a safety edge switch for power-driven equipment such as sliding gates, sliding grilles and so forth and lifting and working platforms and the like, as well as for power-driven doors, sliding equipment and so forth of vehicles, with a hollow profile made of an elastomeric material and exhibiting a mounting profile and a shell part, in which there is at least one internal body, the internal body and the shell part having electrically conductive zones that, upon mutual contact, initiate a switching pulse that can be led to an interpretation unit.

BACKGROUND ART

Such safety edge switches are known in various embodiments. In one design according to DE 33 04 400 A1, the electrically conductive zones are formed by the admixture of conductive substances, for example graphite, into the surface, by the fixation on thin metal foils or the insertion of thin metal meshes or the like, or by the vapor deposition of conductive substances. These designs do represent technically feasible solutions for the creation of a conductive zone, but in practice they have not found adoption because this design is too expensive in construction and too complicated.

In a later embodiment as shown in U.S. Pat. No. 5,023,418 issued Jun. 11, 1991 to Karlheinz Beckhausen for a Safety Edge Switch, the internal body and the shell part cooperating therewith were made electrically conductive, the conductivity being achieved by the admixture of conductive substances, such as carbon black, graphite, metal powder and the like. In this embodiment, not only the respective cooperating surfaces are coated, but the components themselves, that is, the internal body and the shell part, are made in the form of electrically conductive zones.

OBJECTS AND SUMMARY OF THE INVENTION

It is an object of the invention to improve a safety edge switch of the type identified in such a way that it can be affixed, with simple resources, to the end regions of power-driven equipment or power-driven doors and the like. The safety edge switch should also be designed such that it is suitable for the vehicle field and is insensitive to external electrical influences.

This object of the invention is achieved by virtue of the fact that the mounting profile is made electrically conductive and is electrically conductively connected to the internal body or the shell part. The electrical conductivity can advantageously be produced by a conductive wire, a profile or the like in or on the mounting profile. Besides metal wires, other conductive wires made of graphite or the like also come under consideration. The profile is also made of conductive material. The safety edge switch can be fastened to the power-driven equipment with the profile and thus the strength of the end region of the equipment improved. The end region of the sliding gate, sliding grille and the like or of the vehicle door or of the vehicle sliding equipment can also be made as a conductor and the mounting profile conductively connected thereto. Finally, the mounting profile can also be made electrically conductive by the admixture of conductive substances, such as carbon black, graphite, metal powder or the like, and in this way can take over the electrical conductor function. By virtue of these diverse embodiments of the mounting profile, the profile or the safety edge switch no longer need be regarded as an electrical foreign object with respect to the power-operated equipment or doors and so forth, but can thus form with these an electrical unit.

In further development, the mounting profile and the shell part are electrically conductive and conductively connected to each other, a Faraday cage thus being formed, so that even electrostatic charges, which occur very frequently in the vehicle field, do not initiate pulses of the safety edge switch. As already described, the end region of the power-operated equipment or the vehicle door and so forth can thus be electrically incorporated and can serve as conductor (ground conductor).

According to the invention, the mounting profile can be made as a retaining profile enclosing the end region of the power-operated equipment and can have metallic spring clips that are connected to one another and made as conductors. Instead of individual spring clips, there can also be a crimped wire shaped in clip fashion, so that the wire fulfills both the electrical conductor function along the mounting profile and, simultaneously, the clip function. The safety edge switch can be pressed onto the end region, in particular the edge of a door, sliding equipment or the like, and fastened there. It does not matter here if an electrical contact comes into being between the mounting profile or the wire and the door or sliding equipment of the power-driven equipment, because the door itself can also be used as electrical conductor and can be electrically connected to the mounting strip.

The internal body can advantageously have multiple bead-like and strip-like projections that point toward the shell part and preferably contain a conductive wire in the interior. In this way, diverse forces acting on the shell part can facilitate the creation of a contact with the internal body. An electrical connection to the interpretation unit can also advantageously be created by the conductive wire and the electrical conductor or the wire in the mounting profile, the interpretation unit then being connected to the conductive wire and the mounting profile or the wire of the profile inserted there.

Between the internal body and the mounting profile there is advantageously a nonconductive intermediate layer, which extends laterally to the transition from the mounting profile to the shell part. In this way, a safety spacing is also created laterally between the internal body and the shell part, so that inadvertent small lateral deformations do not initiate a pulse.

BRIEF DESCRIPTION OF THE DRAWINGS

For the further explanation of the invention, reference is made to the drawing, in which an exemplary embodiment of the invention is shown in simplified form. The FIGURE shows a cross section through a safety edge switch according to the invention.

DETAILED DESCRIPTION OF THE INVENTION

Figure 1:
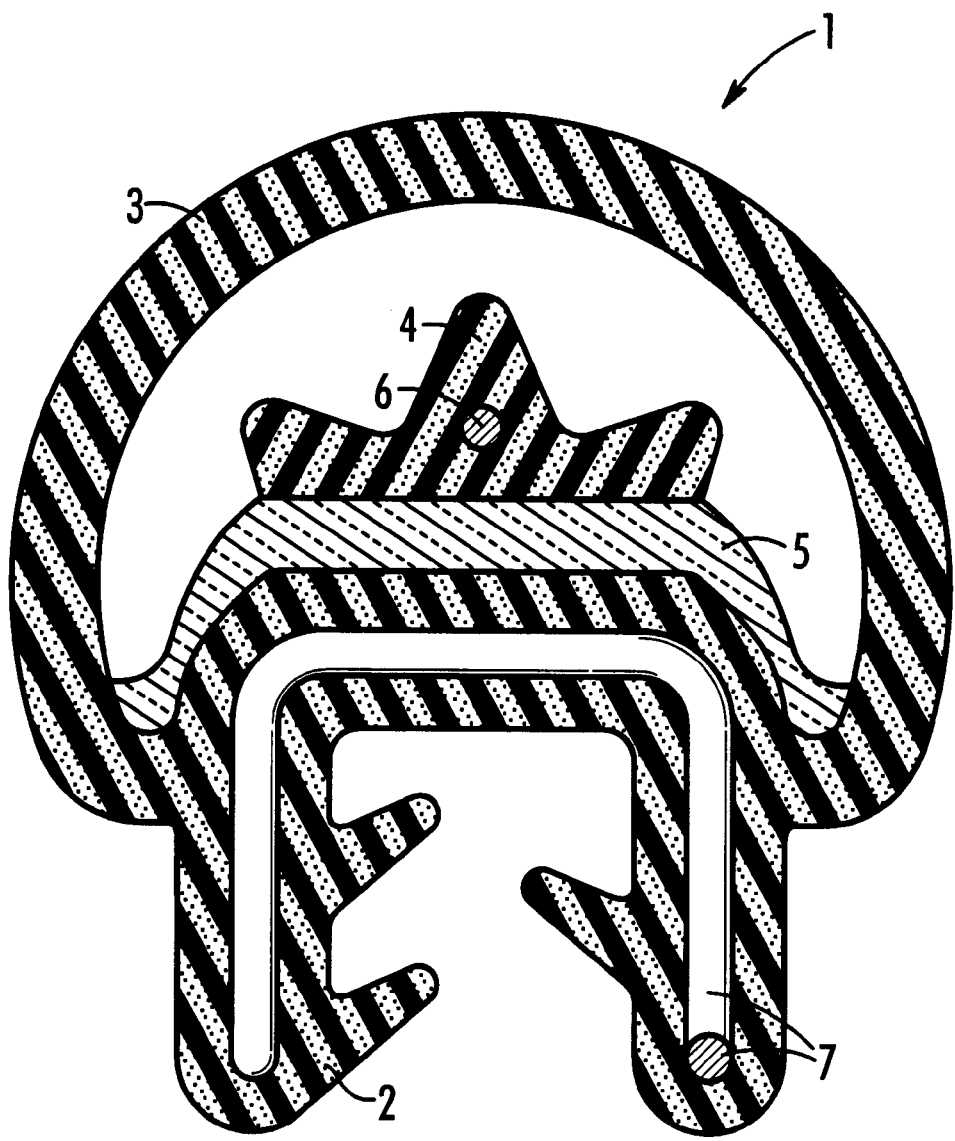

The safety edge switch as a whole is identified by reference numeral 1. It has a mounting profile 2, adjacent to which is a shell part 3 in which an internal body part 4 is arranged. Between internal body part 4 and mounting profile 2 or shell part 3 there is an intermediate layer 5, which is electrically nonconductive. The other parts, namely the mounting profile, the shell part and the internal body part, are made electrically conductive by admixtures of carbon black, graphite, metal powder or the like. Internal body part 4 has three bead-like projections, made as strips, a conductive wire 6 being embedded in the middle projection, the conductive wire being made as a braided copper wire and inserted in the internal body part without insulation. A wire 7, likewise without insulation, is recessed in mounting profile 2, the wire being formed crimped and clip-shaped so that, in addition to electrical conduction, it also performs a spring-clip function in such a way that the mounting profile can be clamped to an edge of a door or the like. Wire 7 is preferably fabricated from stainless material such as V2A or V4A. Connected to the end of wire 7 and of conductive wire 6 is a cable, not illustrated, which leads to the interpretation unit.

What is claimed is:

1. A safety edge switch (1) for a moving component of power driven equipment, comprising:

an electrically conductive hollow profile made of elastomeric material having an inverted U-shaped mounting profile (2) and a rounded shell part (3) which extends laterally beyond said U-shaped mounting profile (2), an electrically conductive internal body part (4) within said shell part (3), said internal body part (4) including a plurality of laterally spaced strip-like projections pointing toward said shell part (3) including a central projection and a pair of laterally outer projections, said internal body part (4) and said shell part (3) being electrically conductive and, upon mutual contact, initiate a switching pulse for an interpretation unit, and a nonconductive intermediate layer (5) between said internal body part (4) and said mounting profile (2) which extends laterally beyond said laterally outer projections of said internal body part 4 and downwardly around the upper part of said U-shaped mounting profile (2) and to said shell part (3) whereby small lateral deformations of said shell part (3) do not initiate a switching pulse.

2. The safety edge switch as set forth in claim 1 wherein said mounting profile (2) includes a spring clip (7) facilitating attachment to an end region of said power driven equipment.

3. The safety edge switch as set forth in claim 2 wherein said spring clip (7) is a one piece crimped wire fashioned as a clip.

4. A safety edge switch (1) for a moving component of power driven equipment, comprising:

an electrically conductive hollow profile made of elastomeric material having a rounded shell part and an inverted U-shaped mounting profile (2) including a base and a pair of spaced parallel legs depending from the base, an electrically conductive internal body part (4) within said shell part (3), said internal body part (4) including at least one strip-like projection pointing toward said shell part (3), said internal body part (4) and said shell part (3) being electrically conductive and, upon mutual contact, initiate a switching pulse for an interpretation unit, a nonconductive intermediate layer (5) between said internal body part (4) and said mounting profile (2), and a metallic crimped wire (7) embedded in said base and legs of said mounting profile (2) forming a series of spring clips serving to clamp said mounting profile to an edge of a door.

* * * * *